Patented Nov. 17, 1931

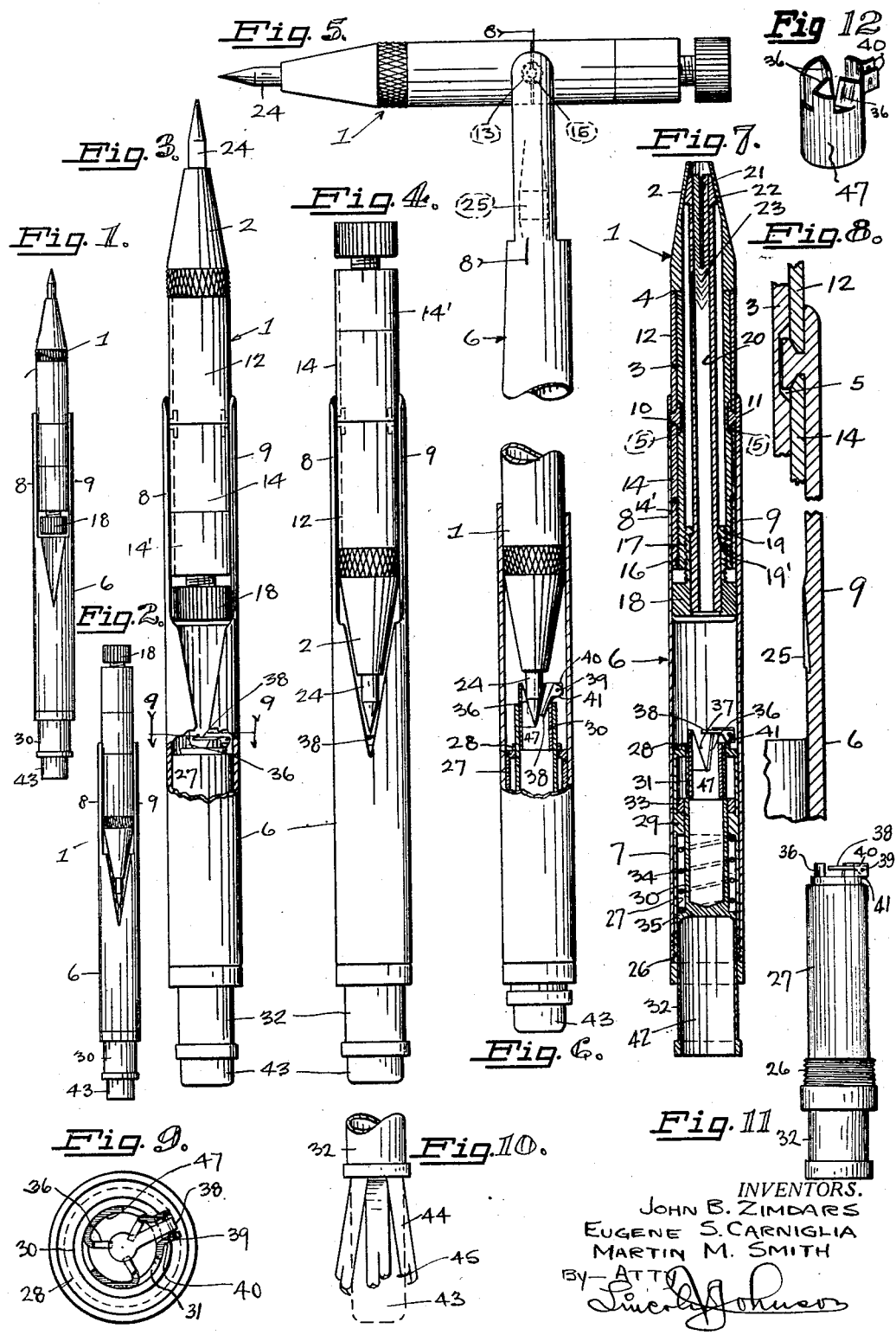

1,832,272

UNITED STATES PATENT OFFICE

JOHN B. ZIMDARS, EUGENE S. CARNIGLIA, AND MARTIN M. SMITH, OF SAN FRANCISCO, CALIFORNIA

PENCIL

Application filed February 11, 1929. Serial No. 339,230.

This invention relates to a lead pencil having a lead sharpening device combined therewith.

An object of the invention is to provide a lead pencil formed of a lead containing casing and a housing, on which the casing is adapted to be pivotally mounted, whereby the lead projecting from the casing may be either concealed within the housing or allowed to project therefrom.

A further object of the invention is to provide a lead pencil formed by combining a lead containing casing with a supporting housing that is adapted to protect the pointed end of the lead casing when in a concealed position and to provide an extension for the lead containing casing when in the extended position, and to also provide a lead sharpening device in an end of the housing that is adapted to be moved into or from contact with the lead for sharpening purposes, there being a gauge adjacent the lead sharpener to determine the length of the lead to be extended from the casing, which said gauge is automatically removed from the sharpener when the said sharpener is moved into position to sharpen the lead.

A still further object of the invention is to provide a circular housing having an end thereof bifurcated to pivotally support therebetween a lead containing casing, whereby said casing may be swung around end for end, with the end of the casing from which the lead projects either concealed within the casing or extended axially therefrom, in conjunction with a sharpener in the housing, and a gauge relative to the sharpener, to regulate the length of the lead to be sharpened, to a predetermined length, preliminarily to moving the sharpener relative to the lead to sharpen the same.

Other objects of the invention are to provide a lead pencil having a lead containing casing therein and with a split ended lead barrel in the casing for holding the said lead in a selected position therein; a housing for holding the lead casing whereby the said lead casing is free to be swung on the housing; a lead sharpening device for sharpening the lead projecting from the casing and having a means to automatically gauge the length of the lead to be sharpened; an erasing device to be mounted on the opposite end of the movable sharpener; and to provide a lead pencil that will be superior in point of simplicity, inexpensiveness of construction, positiveness of operation, and facility and convenience in use and general efficiency.

In this specification and the annexed drawings, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

In the accompanying one sheet of drawings:

Fig. 1 represents an actual size side elevation of a lead pencil constructed in accordance with our invention, with the lead casing in the writing position.

Fig. 2 is an actual size view of the pencil showing the lead casing in the concealed position.

Fig. 3 is a double sized elevation of the pencil in the writing position, partly broken away to show the gauge for determining the length of the lead to be sharpened.

Fig. 4 is an elevation of the pencil with the lead casing in the concealed position and the lead to be sharpened resting on the gauge.

Fig. 5 is a side elevation of the lead casing and supporting housing showing the lead casing being swung from the concealed to the writing position, or vice versa.

Fig. 6 is a fragmentary section showing the lead casing in concealed position within the housing, and the lead sharpener engaged with the lead in the sharpening position.

Fig. 7 is a vertical cross section through the pencil in the writing position, with the lead removed from the barrel and the sharpening device in normal position withdrawn by the spring.

Fig. 8 is an enlarged section taken on the line 8—8 of Fig. 5, showing the method of swivelly mounting the lead casing on the housing.

Fig. 9 is an enlarged cross section taken through Fig. 3 on the line 9—9.

Fig. 10 is a view of the eraser holding means, partially withdrawn from the cavity in which the said eraser is contained.

Fig. 11 is a side elevation of the casing for holding the lead sharpeners.

Fig. 12 is a perspective view of the sharpener element removed from the casing.

In detail the construction illustrated in the drawings, comprises a cylindrical lead containing casing 1, having a constricted and cone shaped end 2, through which sharpened writing lead is adapted to project. The casing 1 is reduced in diameter as at 3, throughout the greater length thereof to provide an annular shoulder 4 near the tapered end thereof. The casing is provided with a circular groove 5 around the outside thereof substantially midway between the opposite ends of the said casing.

A circular housing 6 is provided with a cylindrical end 7 and has its opposite end bifurcated to provide a pair of coextensive arms 8 and 9. A pair of pins 10 and 11 having heads on the ends thereof, are provided on the inside of each of the arms 8 and 9, whereby the axes of said pins are in alignment. The heads on each of the pins 10 and 11 are adapted to lie in the groove 5 on opposite sides of the circumference of the lead casing. A sleeve 12 is arranged over the smaller diametered portion of the lead casing between the shoulder 4 and the pins 10 and 11 on the arms 8 and 9 of the housing, said sleeve 12 having a semi-circular notch 13 cut therein at corresponding points on opposite sides thereof, to pass half way around the circumference of each of the pins 10 and 11, said end of the sleeve 12 being confined between the heads of the pins and the inner face of the bifurcated arms. There is a slight clearance or play around the heads of the pins 10 and 11 to allow the outward swinging of the arms 8 and 9. A sleeve 14, similar to the sleeve 12, is passed over the other end of the casing 3, one end of said sleeve 14 being provided with a semi-circular notch 13 at corresponding points on opposite sides thereof, to pass half way around the circumference of the pins 10 and 11, and to pass between the heads on the ends of the pins 10 and 11 and the inner face of the arms 8 and 9. The opposite end of the sleeve 14 is held in position by a sleeve 14' threaded at 16 into engagement with the end of the casing 3. The sleeves 12 and 14 meet at a point in alignment with the axis of the pins 10 and 11 and hold the said lead casing in a position such that it may be swiveled or swung between the arms 8 and 9 on the housing.

The interior of the lead casing 1 is hollow and an end thereof is internally threaded as at 17. A knurled handled adjusting screw 18 is threaded into engagement with the threaded interior of the lead casing, to be screwed in or out relative thereto. The screw 18 is provided with an internal shoulder 19 on the inner end thereof, to engage a shoulder 19' on the outside of one end of a lead barrel 20 extending centrally within the casing 1. The opposite end of the barrel 20 is slotted lengthwise as at 21 and the outside of said end is tapered, as at 22, to engage the cone-shaped interior of the casing 1. The inside of the end of the barrel is roughened as at 23 to provide a gripping face for the lead contained in said barrel. When the screw 18 is screwed inwardly, the lead barrel 20 is urged toward the cone-shaped end of the casing, whereby the tapered split end of said lead barrel is constricted and thereby produces a squeezing effect on the lead contained within the barrel. The writing lead 24 is contained within the barrel 20 and the lead is fixedly positioned within the barrel by the split ends of said barrel being forced into engagement therewith as the said lead barrel is urged toward the tapered end of the casing. The lead 24 may be projected outwardly from the end of the lead barrel by unloosening the squeezing pressure exerted thereon by the tapered end of the lead casing. The lead is not screw fed from the barrel as in the case of a great many self-feeding pencils, but instead is caused to be dropped by its own weight the desired distance when sufficient freedom to move is granted by the lead containing barrel. Loosening the screw 18 draws back the lead barrel 20 from engagement with the tapered end of the casing 3.

The lead casing 1, may be swung end for end through and between the arms 8 and 9, and aligned axially with the housing 7, with either end of the casing concealed within the housing. The arms 8 and 9 are loose enough and have sufficient resiliency to permit the forcible movement of either end of the lead containing casing therethrough and each of the arms 8 and 9 possesses a small amount of the curvature of the housing 7, to securely hold the casing in axial alignment therewith. However, we have found that it is desirable to augment the curvature of the inner face of the arms 8 and 9 and this we have done by providing a dished depression 25 on the inner side of each of the arms 8 and 9 within which the outside of the casing will lie when either in the concealed or writing position. When the lead end of the casing is placed in an axially extended position relative to the housing 7, the assembly is of a length well suited for writing purposes, and when the writing end of the casing is reversed, so as to lie in a concealed position within the housing, the over-all length of the assembly is reduced and a relatively small sized device is formed, that is not too bulky to be conveniently carried in the pocket.

When the lead end of the casing is placed in the writing position, the grooves 25 on the inside faces of the bifurcated arms 8 and 9 engage the outside of said lead casing and prevent the said lead barrel from rotating while in the writing position.

The tubular end 7 of the housing 6 is internally threaded as at 26. A tubular casing 27 having an external diameter substantially the same as the internal diameter of the housing, is projected therein, the outer end of the tube 27 being threaded externally to engage with the threaded interior 26 of the housing. An internal shoulder 28 is provided on the end of the tube 27 that is concealed within the housing 6, and an internal shoulder 29 is provided around the interior of the tube 27 in spaced relation to the shouldered end 28 thereof. A dual diametered sleeve 30 is mounted within the tube 27, the smaller diametered portion 31 of said sleeve being slidable through within the shoulders 28 and 29, and the larger diametered end 32 of said sleeve being slidably confined by the inner circumference of the sleeve 27. A collar 33 is provided around the sleeve 27 between the shoulders 28 and 29 to limit the reciprocating or axial movement of the sleeve. An expansion spring 34 is confined between the shoulder 35 on the sleeve 30 and the annular shoulder 29 on the tube 27. The spring 34 acts to keep the collar 33 on the said sleeve in engagement with the shoulder 29 on the tube 27 and to resist movement of the sleeve 30 lengthwise within the said tube 27. A plurality of radially disposed and converging cutters 36 forming a V-shaped cutting notch 37 therein are arranged in spaced relation around the inner end of the sleeve 30 facing an end of the lead casing 1. The notch 37 of the cutters is adapted to receive the end of the writing lead therein, to sharpen the same.

In order to have the proper length of lead extended from the lead casing for pointing purposes, the operator places the lead end of the casing in the concealed position within the housing and allows the lead to fall into engagement with a gauge 38 that lies across the notch entering into the sharpeners 36 as is shown in Figs. 3, 4 and 7, and then advances the screw 18 to grip the lead in the barrel. The gauge 38 is pivoted at 39 in a bracket 40 mounted on the side of the sharpener sleeve 30. The gauge 38 is provided with a depending projection 41 on an end thereof, which projection 41 engages the shouldered end 28 of the tube 27. The plates 36 are normally held in a non-sharpening position by reason of the spring 34 holding the sharpener barrel 30 in a relatively immovable position within the tube 27. In this position, the projection 41 on the gauge 38 will rest on the end of the sleeve 27 and position said gauge 38 in a transverse position within the housing across the ends of the cutters 36. When the lead casing is swung into the concealed or sharpening position, as shown in Figs. 4, and 6, the operator slides the sharpener tube 30 toward the lead, which action slides the notch in the cutters up around the outside of the lead to be pointed and at the same time moves the gauge 38, and the projection 41 thereon, away from the stationary sleeve 27, thereby removing the transverse support therefrom and permits said gauge to drop into the non-operating, position shown in Fig. 6. With the sharpener blades thus engaged, the casing 1 carrying the lead barrel 20 and lead 24 is rotated so that the point of the lead is rotated between the cutters 36 until such time as the desired point has been placed on the said lead. During the sharpening operation, the spring 34 is placed under compression and as soon as the sharpening pressure is released, the spring 34 automatically causes the sharpener barrel 30 to be moved into inoperative position to permit the lead casing to be swung out of the housing for use. Immediately that the sharpener barrel 30 is drawn into inoperative position, the gauge 38 automatically swings up into the engaging position, to be in position to engage the end of the lead 24 whenever the lead should be released for projection. The distance between the upper surface of the gauge 38 and the end of the casing from which the lead 24 is dropped, is calculated to allow for a sufficient length of lead to extend from the casing to provide a suitable point for writing purposes, hence, the function of the gauge 38 is merely to regulate the length of lead that projects from the lead casing so that at all times the user of the pencil will be insured of a writing point of substantially the same length, however, this projecting of the lead need only take place when the lead has been successively sharpened down.

The outer end of the sharpener barrel 30 is provided with an eraser recess 42 therein. The eraser 43 is tubular and is adapted to be held within a clamp formed of a plurality of fingers 44 made out of spring metal and having the ends thereof pointed and turned inwardly as at 45 to bite into the eraser material. The prongs 45 on the eraser holder permit the eraser to be used in its entirety merely by pulling the same outwardly as the eraser becomes worn down. The metal used in making the eraser holding fingers 44 is springy enough so that the eraser and fingers may be formed into the eraser recess 42 to hold said eraser against any escaping action and readily spring out when the eraser is withdrawn.

The cutters 36 are formed out of a short length of tubing 47, an end of the tubing being cut diagonally along and around the circumference thereof, and the cut parts are bent inward so that the edges thereof form the cutters 36. Ears 40 are also bent outward on the tubing to form the supporting bracket for the gauge 38.

Having thus described this invention, what we now claim and desire to secure by Letters Patent is:

1. A pencil comprised of a lead containing casing; a housing having a bifurcated end pivotally connected to said casing; a lead sharpener mounted in the opposite end of said housing and movable axially relative to an end of the lead containing casing; and means across the end of the sharpener to determine the length of the lead to project from the lead casing preliminarily to being sharpened, said means being movable toward the sharpener end into inoperative position as the sharpener is moved axially toward the end of the lead casing.

2. A pencil comprised of a cylindrical housing having an end thereof bifurcated; a lead casing, swingably connected to the bifurcated end of said housing and adapted to be aligned axially with said housing; an axially movable lead sharpener mounted in the cylindrical end of the housing adapted to be advanced into or out of contact with the end of the lead casing; and means across the end of the sharpener to determine the length of the lead to project from the lead casing preliminarily to being sharpened, said means being movable away from the end of the lead as the sharpener is moved axially toward the end of the lead casing.

3. A pencil comprised of a cylindrical housing having an end thereof bifurcated; a lead casing, swivelly connected to the bifurcated end of said housing and adapted to be aligned axially with said housing; an axially movable lead sharpener mounted in the cylindrical end of the housing adapted to be advanced into or out of contact with the end of the lead casing; consisting of converged cutters forming a V-shaped cutting notch; and means across the end of the sharpener to determine the length of the lead to project from the lead casing preliminarily to being sharpened, said means being movable into inoperative position as the sharpener is moved axially toward the end of the lead casing.

4. A pencil comprised of a lead containing casing; a housing swivelly and pivotally connected at one end thereof to said casing; resilient means on said housing to hold said casing in axial alignment therewith; a lead sharpener mounted in an end of said housing consisting of converged cutters forming a V-shaped cutting notch therein; and means across the end of the sharpener to determine the length of the lead to project from the lead casing preliminarily to being sharpened, said means being movable into inoperative position as the sharpener is moved axially toward the end of the lead casing.

5. A pencil comprised of a lead containing casing; a housing having a bifurcated end pivotally connected to said casing; a lead sharpener mounted in the opposite end of said housing and movably axially relative to an end of the lead containing casing; a gauge pivotally attached to one side of the sharpener to determine the length of the lead to project from the lead casing preliminarily to being sharpened; and a projection on the gauge engaging a shoulder on the housing to hold the gauge across the end of the sharpener when the sharpener is inoperative, said gauge being dropped away from the end of the lead by disengagement of the shoulder and projection when the sharpener is rendered operative.

6. A pencil comprised of a cylindrical housing having an end thereof bifurcated; a lead casing, swivelly connected to the bifurcated end of said housing and adapted to be aligned axially with said housing; an axially movable lead sharpener mounted in the cylindrical end of the housing adapted to be advanced into or out of contact with the end of the lead casing; a gauge pivotally attached to one side of the sharpener to determine the length of the lead to project from the lead casing preliminarily to being sharpened; and a projection on the gauge engaging a shoulder on the housing to hold the gauge across the end of the sharpener when the sharpener is inoperative, said gauge being dropped away from the end of the lead by disengagement of the shoulder and projection when the sharpener is rendered operative.

7. A pencil comprised of a cylindrical housing having an end thereof bifurcated; a lead casing, swivelly connected to the bifurcated end of said housing and adapted to be aligned axially with said housing; an axially movable lead sharpener mounted in the cylindrical end of the housing adapted to be advanced into or out of contact with the end of the lead casing, consisting of converged cutters forming a V-shaped cutting notch; a gauge pivotally attached to one side of the sharpener to determine the length of the lead to project from the lead casing preliminarily to being sharpened; and a projection on the gauge engaging a shoulder on the housing to hold the gauge across the end of the sharpener when the sharpener is inoperative, said gauge being dropped away from the point of the lead by disengagement of the shoulder and projection when the sharpener is rendered operative.

8. A pencil comprised of a lead containing casing; a housing swivelly and pivotally connected at one end thereof to said casing; resilient means on said housing to hold said casing in axial alignment therewith; a lead sharpener mounted in an end of said housing consisting of converged cutters forming a V- shaped cutting notch therein; a gauge pivotally attached to one side of the sharpener to determine the length of the lead to project from the lead casing preliminarily to being sharpened; and a projection on the gauge engaging a shoulder on the housing to hold the gauge across the end of the sharpener when the sharpener is inoperative, said gauge being dropped away from the point of the lead by disengagement of the shoulder and projection when the sharpener is rendered operative.

9. A pencil having a lead containing casing therein; a housing pivotally connected to said casing and alignable therewith; a rotatable lead sharpener in the housing movable toward and from the lead casing; and a gauge across the sharpener to regulate the distance of projection of the lead out of the casing for sharpening purposes.

10. A pencil having a lead containing casing therein; a housing pivotally connected to said casing and alignable therewith; a rotatable lead sharpener in the housing movable toward and from the lead casing; a gauge across the sharpener to regulate the distance of projection of the lead out of the casing for sharpening purposes; and co-acting means on the gauge and housing to effect movement of the gauge into and out of operative position as the sharpener is moved lengthwise in the casing.

11. A holder for a pencil lead sharpener comprising a cylindrical casing having a shoulder therein; a tube having a lead sharpener in an end thereof, reciprocatingly mounted in the casing; a shoulder on the tube in operative spaced relation to the first shoulder and an expansion spring confined between the casing and tube and between the shoulders on the casing and the tube to resist reciprocating movement of the tube.

12. A lead pencil comprising a tubular member containing writing lead; a sleeve rotatably mounted around the outside of said member; and a sharpener holder pivotally connected to the sleeve whereby the member can be rotated in the sleeve and the sleeve and member can be swung relative to the holder.

13. A holder for a pencil lead sharpener comprising a cylindrical casing having a pair of shoulders arranged in spaced relation therein; a tube, having a lead sharpener in an end thereof, reciprocatingly mounted in the casing; a gauge pivotally mounted on the tube to extend across the sharpener by engagement with an end of the casing; and an expansion spring confined between the casing and tube and between the shoulders on the casing and the tube to resist reciprocating movement of the tube, said spring normally holding the tube in an inoperative position in the casing and holding the gauge extended across the sharpener whereby, when the tube is reciprocated into the operative position to overcome the spring tension, the support of the gauge in the extended position by the casing is removed and the gauge is allowed to drop into inoperative position and said gauge is automatically restored to its extended position when the spring moves the tube into its normal inoperative position.

14. A lead pencil comprising a housing having a lead containing casing pivotally mounted thereon and adapted to be swung end for end into either a writing or non-writing position in axial alignment with the housing; a barrel reciprocatingly mounted in the housing; a sharpener in an end of the barrel having a V shaped cutting notch therein engageable at any of the three hundred and sixty degrees of its rotative movement with the lead projected from the casing when in the non-writing position.

15. In combination, a lead containing casing and a sharpener housing connected to said casing, said housing having a pair of shouldered heads on diametrically opposite sides of an end thereof engaging an annular groove in the lead containing casing; sleeves around the said lead containing casing to hold the housing pivots in engagement with the lead casing to permit said lead casing to be rotated on its longitudinal axis within the sleeve and to be revolved about the axis of the shouldered heads on the housing.

In testimony whereof, we have hereunto set our hands at San Francisco, California, this 16th day of November, 1928.

JOHN B. ZIMDARS.
EUGENE S. CARNIGLIA.
MARTIN M. SMITH.